United States Patent [19]

Satterly et al.

[11] 4,166,056

[45] Aug. 28, 1979

[54] POLYESTER PLASTICIZER FOR VINYL RESINS DERIVED FROM ADIPIC ACID PROCESS WASTE

[75] Inventors: Kenneth P. Satterly, Avondale, Pa.; Frank E. Livingston, Wilmington, Del.

[73] Assignee: Witco Chemical Corporation, New York, N.Y.

[21] Appl. No.: 895,897

[22] Filed: Apr. 13, 1978

[51] Int. Cl.² .................... C08K 5/11; C08L 67/02; C08L 67/04

[52] U.S. Cl. .............................. 260/31.6; 260/31.8 R; 528/272; 560/129

[58] Field of Search ................... 528/272; 260/31.8 R, 260/31.6, 873

[56] References Cited

U.S. PATENT DOCUMENTS

| | | | |
|---|---|---|---|
| 2,555,062 | 5/1951 | Small et al. .................. | 528/272 X |
| 2,749,329 | 6/1956 | Ludlow .......................... | 528/272 |
| 3,055,867 | 9/1962 | LeBras et al. .................. | 528/272 X |
| 3,365,490 | 1/1968 | Arthur et al. .................. | 260/537 X |
| 3,850,871 | 11/1974 | Walus ............................. | 260/31.6 |

*Primary Examiner*—Walter C. Danison
*Attorney, Agent, or Firm*—Albert L. Gazzola; Morton Friedman

[57] ABSTRACT

A waste stream of non-volatiles is recovered (NVR) as a by-product from the oxidation of cyclohexane to cyclohexanone and chlohexanol in the process for making adipic acid. The NVR is dehydrated, and then reacted with an esterifying polyol to form a polyester polyol which was found to be useful in the dispersion of vinyl resins. Those polyester polyols with low acid numbers of less than 10, and referably less than 2, were found to be most effective as vinyl dispersion plasticizers. A particularly useful end-product is a tough vinyl resin film having a Shore A hardness of approximately 55. End-products may also be used in wire coatings and coverings.

14 Claims, No Drawings

POLYESTER PLASTICIZER FOR VINYL RESINS DERIVED FROM ADIPIC ACID PROCESS WASTE

This invention relates to plasticizers for vinyl resins. Specifically this invention relates to a process for obtaining a polyester plasticizer for making vinyl products. More specifically, this invention relates to processing a waste stream of non-volatile residues to obtain a polyester useful as a plasticizer in making tough vinyl products.

In the conventional process for the manufacture of adipic acid, such as disclosed in Arthur et al., U.S. Pat. No. 3,365,490 granted Jan. 23, 1968, cyclohexane is oxidized with air to form cyclohexanone and cyclohexanol, as well as non-volatile residue (NVR). The cyclohexane and cyclohexanol are separated from the residue, and further oxidized with aqueous nitric acid to form adipic acid. The NVR as noted in Arthur et al. is nonuseful, and Arthur et al. seeks to use same for the further production of adipic acid.

Commercial adipic acid processes have usually involved a fractionation of the products from the air oxidation of cyclohexane prior to the nitric acid oxidation step. This fractionation separates out cyclohexanol and cyclohexanone from the non-volatile residue. This residue contains some free adipic acid and esters of adipic acid plus a complex mixture of oxidation products, including other dicarboxylic acids, which under the conditions required for optimum nitric acid oxidation of cyclohexanol and cyclohexanone do not provide an economic source of adipic, glutaric, and succinic acids.

Homologous precursors to the dibasic acids such as glutaric and succinic acids are also present. The prior art sought to convert this residue into recoverable adipic, glutaric, and succinic acids.

Today, it is common practice to dump literally millions of pounds of NVR annually. This dumping is both costly and ecologically undesirable.

The prior art related to vinyl resin plasticizers was directed to two distinct types of resins, one was the low molecular weight compounds, typified by dioctyl phthalate (DOP), and the other was a high polymer. Briefly the low molecular weight polymers rendered good plasticity to vinyl but were highly subject to leaching out. The polymeric plasticizers were not subject to leaching out, but were not generally as effective as the DOP, and more costly than the DOP. Often the prior art, in an effort to obtain good plasticization without leaching, sought to remedy this selection of plasticizer by blending the DOP with the polymeric plasticizers in varying ratios.

Now by the present invention there is provided a process and product therefrom, which product is found to be an effective plasticizer for vinyl dispersion resins and yet is not readily subject to leaching out.

Now also by the present invention, it has been found that NVR is useful in a process to produce commercially acceptable polyester plasticizers found useful in vinyl resin dispersions.

It is therefore a principle object of this invention to provide a process for making polyester plasticizers for vinyl dispersions by employing NVR starting material.

It is another object of this invention to provide a process as aforesaid and a commercially desirable vinyl film therefrom.

It is still a further object of this invention to provide a process wherein the NVR is converted to a polyester having properties sufficient for the dispersion of a commercial-grade vinyl resin to form a useful vinyl product.

It is still a further object of this invention to provide a process for rendering the NVR waste stream from the adipic acid process, useful as a component material in producing vinyl products.

Broadly speaking, the process of this invention may be considered as reacting an NVR waste stream comprising a mixture of hydroxycaproic acid, monobasic acids, and dibasic acids or dibasic acid precursors with an esterifying polyol to form a polyester; and mixing the polyester with a vinyl resin to disperse same, and then curing the resin to form a vinyl resin product.

In another aspect, this invention is a process for making a vinyl resin product comprising:

a. Oxidizing cyclohexane to form cyclohexanone, cyclohexanol, and a non-volatile residue (NVR);

b. separating out the non-volatile residue (NVR), and;

c. reacting the recovered residue with an esterifying polyol to form a polyester polyol;

d. mixing the polyester polyol with a vinyl resin to form a dispersion, and;

e. curing the vinyl dispersion to form the vinyl resin product.

This invention also contemplates the new product produced by the aforesaid processes.

In a more specific aspect of the invention, it has been found that large portions of at least 75% by weight of useful acids may be recovered.

Such acid streams were found to be useful in forming polyesters having an acid number of 2 to 10 and a hydroxyl number of from 5 to about 100. Surprisingly, such formed polyesters were found useful as plasticizers in the production of tough vinyl products. Specifically, it has been found that the most preferred polyester polyols pursuant to this invention are those having an acid number of less than 10, and preferably less than 2, although a broad range of hydroxyl number is found to be permissible in achieving good plasticizing.

Suitable esterifying polyols useful in reacting with the NVR fraction include diols of relatively low molecular weight such as ethylene glycol, propylene glycol, butylene glycol, and the like as well as diethylene glycol, dipropylene glycol, as well as triols of low molecular weight such as trimethylol propane, and glycerine, and mixtures. Typical hydroxyl content of the above type hydroxyl containing chemical will be in the range of 280 to 1810.

In the esterification of the NVR fraction, the well known esterification catalysts may be used, including the organotin catalysts such as dibutyltin dilaurate, as well as the well known organo-titanates. Esterification may be conducted under standard temperature and pressure, and the catalyst is employed in its customary amounts.

The esterification product is added to the vinyl dispersion resin in customary amounts for plasticizers. Additional types of plasticizers are not required. The plasticizer of this present invention may be added to the vinyl resin in a 50:50 weight ratio, although more or less may be added depending upon the desired physical properties of the cured vinyl product.

As previously mentioned the NVR is a waste product and as such no typical component analysis can be readily set forth. An extensive effort has been made to analyze the NVR and 17 separate compounds have been identified leaving approximately 40% of the total unidentified. The major components are adipic acid, valeric acid, caproic acid, and hydroxy caproic acid. Their content in the NVR will vary from time to time, for example the adipic acid content has varied from 32% of the total to 5% of the total.

A more specific breakdown of typical NVR acids is as follows.

The composition of this material, exclusive of water, is as follows:

| Component | Weight Percent (Dry Basis) |
|---|---|
| Hydroxycaproic Acid | 12.2 |
| Monobasic Acids | 46.1 |
| Butyric | 5.5 |
| Valeric | 30.0 |
| Caproic | 10.6 |
| Dibasic Acids | 21.8 |
| Glutaric | 3.8 |
| Adipic | 18.0 |
| Cyclohexanol | 4.9 |
| Unresolved | 15.0 |

Typical actual composition analyses on NVR sample is as follows:

| Compound | Weight, % |
|---|---|
| Pentanol | 0 |
| Cyclohexanone | .1 |
| Cyclohexanol | .4 |
| Acetic Acid | .1 |
| Cyclohexene-one | .1 |
| Butyric Acid | 1.4 |
| Butyrol Lactone | .5 |
| Isovaleric Acid | 0 |
| Valeric Acid | 7.6 |
| Volatile Unknowns (Straight) | 2.0 |
| Hydroxy Valeric Lactone | .3 |
| Caproic Acid | 2.9 |
| Hexanol | 0 |
| Methyl Pentanol | 9.5 |
| Succinic Acid | .1 |
| Glutaric Acid | .3 |
| Hydroxy Caproic Acid | 7.2 |
| Adipic Acid | 5.0 |
| Volatile Unknowns (Silyl Esters) | 19.0 |
| Water | 24.2 |
| Total Analyzed | 80.7 |
| Non-Volatiles | 19.3 |

Often the NVR waste stream from the adipic acid process contains substantial quantities of water, up to about 40% by weight of the NVR. It was found not necessary, although useful in the practice of the present invention to reduce this water content of the NVR before polymerization with the polyols, as a suitable product was made in either case.

The invention is illustrated, but not limited, by the following examples.

EXAMPLE I

A sample of a non-volatile residue (NVR) from a commercial adipic acid process was obtained having the following composition:

| 6-hydroxycaproic acid | 43% by weight (dry basis) |
|---|---|
| C$_2$ to C$_6$ monobasic acids | 36% by weight (dry basis) |
| Dibasic acid precursors | 21% by weight (dry basis) |
| Water | 40% by weight |

-continued (approximate)

The NVR is heated for 2–3 hours at 180° C. to 250° C. to remove the water and to partially homopolymerize the 6-hydroxycaproic acid by the well known condensation reaction, with the liberated water of condensation being driven off as well as the latent water of the NVR fraction. After heating, the acid number was found to be 130 and the water content was 0.3% by weight of the "dried" NVR fraction.

To 1000 grams of the "dried" NVR, the following was added:

| 100 grams | ethylene glycol |
|---|---|
| 6 grams | trimethanol propane |
| 1.1 grams | dibutyltin dilaurate |

Esterification was effected at between 200° C. ±10° C. over a period of eight hours.

The esterification product was found to have an acid number of 3.6, a hydroxyl number of 6.5, and a viscosity of 4000 cps.

To 10 parts by weight of a vinyl dispersion resin, namely Geon-121 ("Geon" is a registered trademark of B. F. Goodrich Co., and Geon-121 is a mixture of homopolymers), there was added 10 parts by weight of the aforesaid esterification product. It was visually noted that the dispersion was accomplished. This dispersion was cured as a film in an oven at 400° F. for 5 minutes, and the product film was found to have a Shore A hardness of approximately 55.

EXAMPLE II

Another lot of NVR similar to that used in Example I was used as follows.

To 1500 grams of NVR was added 326 grams of diethylene glycol. Heat was applied, and when the temperature of the distillate rose over 100° C. indicating all the water was removed from the original mixture, 0.36 grams of tetraisopropyl titanate was added. Esterification was effected at 200° ±10° C. over a period of 12 hours. The esterification product was found to have an acid number of 2.6 and a viscosity of 850 centipoises per second.

To 100 parts of by weight of a vinyl dispersion resin, namely Geon 103EP, there was added 2.5 parts of Markcure 727 (a stabilizer, a trademark of Witco Chemical Corporation, New York, N.Y.), and 5 parts of Drayplex 6.8 to 50 parts of the aforesaid esterification product. Curing was thus effected and the resulting film had the following physical properties:

| Tensile strength, psi | 2535 |
|---|---|
| Elongation, % | 340 |
| Set, % | 150 |

The embodiments of the invention in which an exclusive property or privilege is claimed are defined as follows:

1. A process for making a plasticizer for vinyl resins comprising:
   a. oxidizing cyclohexane to form cyclohexanone, cyclohexanol, and a non-volatile residue (NVR):
   b. separating out the non-volatile residue (NVR), and;

c. reacting the recovered residue with an esterifying polyol to form a polyester polyol having an acid number of about 10 or less and a hydroxy number of between 5 and 100, wherein said polyester polyol disperses a vinyl resin.

2. The process of claim 1, wherein step c further comprises heating the NVR.

3. The process of claim 2, said heating being at temperatures between 180° C. to 250° C. for 1 to 5 hours.

4. The process of claim 1, wherein the esterifying polyol comprises a mixture of dihydroxyl and trihydroxyl compounds.

5. A process for making a vinyl resin product comprising:
   a. reacting a mixture comprising hydroxycaproic acid, $C_2$ to $C_6$ monobasic acid, and dibasic acids, with an esterifying polyol having an acid number of about 10 or less and a hydroxy number of between 5 and 100, to form a polyester:
   b. mixing the polyester with a vinyl resin to form a dispersion, and;
   c. curing the dispersion to form a vinyl resin product.

6. The process of claim 5, wherein the monobasic acids are $C_2$ to $C_6$ monobasic acids and are present in an amount of from 5 to about 40% by weight (dry basis) of the mixture of step a.

7. The process of claim 5, wherein the dibasic acids are present in amount of from about 10 to 30% by weight (dry basis) of the mixture of step a.

8. The process of claim 5, wherein the polyester has an acid number less than 2.

9. The process of claim 5, wherein the mixture has a water content of less than 1%.

10. The process of claim 5, wherein the hydroxycaproic acid comprises a partial homopolymer of 6-hydroxycaproic acid.

11. The process of claim 5, wherein the esterifying polyol is a mixture of dihydroxyl and trihydroxyl compounds.

12. The plasticizer produced from the process of claim 1.

13. The vinyl product produced from the process of claim 5.

14. The product produced from the process of claim 13, wherein the product is a film having a Shore A hardness of at least 50.

* * * * *